United States Patent [19]

Lehr

[11] Patent Number: 5,649,085
[45] Date of Patent: Jul. 15, 1997

[54] METHOD AND SYSTEM FOR STORING AND DISPLAYING SYSTEM OPERATION TRACES WITH ASYNCHRONOUS EVENT-PAIRS

[75] Inventor: Theodore Franklin Lehr, Austin, Tex.

[73] Assignee: International Business Machines Corporation, Armonk, N.Y.

[21] Appl. No.: 353,009

[22] Filed: Dec. 9, 1994

[51] Int. Cl.$^6$ ............................................. G06T 11/00
[52] U.S. Cl. ..................... 395/140; 345/118; 364/267; 395/701; 395/704; 395/966
[58] Field of Search .................... 395/140, 154, 395/701, 704, 966; 364/267; 345/24, 26, 131, 141, 118

[56] References Cited

U.S. PATENT DOCUMENTS

| | | | |
|---|---|---|---|
| 3,748,650 | 7/1973 | Garcia et al. | 340/172.5 |
| 4,205,370 | 5/1980 | Hirtle | 364/200 |
| 4,720,778 | 1/1988 | Hall et al. | 364/200 |
| 5,048,018 | 9/1991 | Berenstein et al. | 371/19 |
| 5,058,114 | 10/1991 | Kuboki et al. | 371/19 |
| 5,168,554 | 12/1992 | Luke | 395/161 |
| 5,210,859 | 5/1993 | Aoshima et al. | 395/575 |
| 5,375,125 | 12/1994 | Oshima et al. | 395/575 |
| 5,386,581 | 1/1995 | Suzuki et al. | 395/800 |
| 5,442,740 | 8/1995 | Parikh | 395/140 |

OTHER PUBLICATIONS

IBM Technical Disclosure Bulletin vol. 36, No. 07 Jul. 1993 pp. 547–557 T.F. Lehr.

Tehodore Franklin Lehr, "Data Structure and Insertion Algorithm for Representing Asynchronous Occurrences for Visualization by Trace Visualization Tools Using Ghant Charts With Occurrence Hierarchies", Jul. 1993, vol. 36, No. 07, pp. 547–557.

*Primary Examiner*—Mark R. Powell
*Assistant Examiner*—Vincent E. Kovalick
*Attorney, Agent, or Firm*—Richard A. Henkler; Brian A. Russell; Andrew J. Dillon

[57] ABSTRACT

A method and system of displaying system operation trace information are provided which include displaying a window within the display device of a computer and displaying an axis within the window having points along it which correspond to time. Graphical objects, corresponding to event-pairs selected from the trace of system operation, are then displayed in relation to the axis such that the position of a graphical object in relation to the axis is indicative of the starting and ending time of the corresponding event-pair. In response to a new event-pair having a starting time nested within a previously inserted event-pair and preceding an ending time of a third event-pair having a nesting depth identical to the new event-pair, a graphical object representing the new event-pair is automatically displayed adjacent to the graphical object representing the prior event-pair such that the graphical object representing the new event-pair is not visually obscured by the graphical object representing the third event-pair. In a second aspect of the invention, a new event-pair is inserted into the data structure storing system operation trace data. Start times of event-pairs within the data structure are examined to determine second and third event-pairs having start times immediately preceding and immediately following the new event-pair's start time, respectively. The new event-pair is then inserted into the data structure, wherein relationships between event-pairs are specified according to a predetermined set of rules.

8 Claims, 9 Drawing Sheets

METHOD AND SYSTEM FOR STORING AND DISPLAYING SYSTEM OPERATION TRACES WITH ASYNCHRONOUS EVENT-PAIRS

BACKGROUND OF THE INVENTION

1. Technical Field

The present invention relates in general to a method and system for displaying information and in particular to a method and system for displaying system operation trace information. Still more particularly, the present invention relates to a method and system for graphically displaying system operation trace information so that graphical objects representing event-pairs within the system operation are not visually obscured.

2. Description of the Related Art

A "trace" of a software or a hardware system is a recording of the chronology of events or states which the system executes. Trace chronologies are used in performance analysis and debugging. Events in trace chronologies are often paired, forming event-pairs. Examples of events which are paired in this way are the start and end times of programs, functions, and system calls.

Event-pairs within a trace may be nested. Event-pair A is synchronously nested under event-pair B if A begins and ends within B's execution. That is, A is synchronously nested under B if STARTTIME (A)>STARTTIME (B) and ENDTIME (A)<ENDTIME (B). In such a case, one may refer to B as the a synchronous "ancestor" of A, and A as a synchronous "descendant" of B. An example of a synchronously nested event-pair is a system call which executes entirely within a function. Event-pairs may also be asynchronously nested. For event-pair A to be asynchronously nested under B, it is necessary and sufficient that A begins within the execution of B and all of B's ancestors, and that A ends after B ends. That is, A is asynchronously nested under B when STARTTIME (A)>STARTTIME (B and all of B's ancestors) and ENDTIME (A)>ENDTIME (B). In such a case, one may refer to B as an asynchronous "ancestor" of A, and A as an asynchronous "descendant" of B. An example of an asynchronously nested event-pair is a page-fault which causes I/O to begin within a system call.

Trace chronologies are more effectively utilized when event-pairs are displayed graphically along a time line. A Ghant chart, also known as a bar chart or a histogram, is a common format for displaying trace chronologies. In a Ghant chart, rectangles of various lengths, representing different event-pairs, are arranged parallel to a time axis. State-of-the-art trace visualization tools like PieScope, a tool developed by IBM Corp., permit event-pair nesting and represent nested event-pairs by displaying adjacent or overlapping rectangles in a complex Ghant chart.

A drawing problem arises, however, when two unrelated and mutually unnested event-pairs (event-pairs not nested with each other) are assigned equal nesting depths and at least one of them is asynchronously nested with a third event-pair. For example, assume A1, A2, B1 and B2 are event-pairs. Assume B1 is synchronously nested under A1 and B2 is synchronously nested under A2. Assume, also, that A1 and B1 are mutually unnested with A2 and B2. If A1 and A2 have nesting levels of zero and B1 and B2 have nesting levels of one, a graphical object representing event-pair B1 will partly or completely obscure a graphical object representing B2 if ENDTIME (B1)>STARTTIME (B2). Consequently, it would be desirable to have a method and system for graphically displaying trace chronologies in which asynchronously nested event-pairs are represented without obscuring graphical objects representing other event-pairs.

An additional problem arises in storing the data required to graphically display event-pairs within a trace chronology. Event-pair data are often stored in data structures having a number of entries representing event-pairs within the trace chronology. Each entry includes pointers or other indicia of the relationship of its event-pair to other event-pairs within the trace chronology. To insert an event-pair in the trace chronology, an algorithm is utilized to determine the relationship of a new event-pair to existing event-pairs and to reflect the relationship by inserting an entry storing data utilized to display the new event-pair at the proper location in the data structure.

Algorithms utilized in state-of-the-art trace visualization tools such as PieScope, which enable the depiction of asynchronous event-pairs, are often cumbersome and inefficient because they utilize many tests to determine relationships between event-pairs. For example, earlier version of PieScope utilize an algorithm which determines the insertion point by comparing the start and end times of the new event pair to the start and end times of each successive event-pair within the data structure, beginning with the earliest occurring event-pair. Earlier versions of the PieScope algorithm also utilize a multiplicity of comparisons to determine how the insertion of the new event-pair affects the relationships of surrounding event-pairs. Consequently, it would be desirable to have a method and system for efficiently inserting event-pairs in a data structure storing data utilized to display a trace chronology.

SUMMARY OF THE INVENTION

It is therefore one object of the present invention to provide an improved method and system for displaying information.

It is another object of the present invention to provide an improved method and system for displaying system operation trace information.

It is yet another object of the present invention to provide an improved method and system for graphically displaying system operation trace information so that graphical objects representing event-pairs are not visually obscured.

The foregoing objects are achieved as is now described. A method and system of displaying system operation trace information are provided which include displaying a window within the display device of a computer and displaying an axis within the window having points along it which correspond to time. Graphical objects, corresponding to event-pairs selected from the trace of system operation, are then displayed in relation to the axis such that the position of a graphical object in relation to the axis is indicative of the starting and ending time of the corresponding event-pair. In response to a new event-pair having a starting time nested within a previously inserted event-pair and preceding an ending time of a third event-pair having a nesting depth identical to the new event-pair, a graphical object representing the new event-pair is automatically displayed adjacent to the graphical object representing the prior event-pair such that the graphical object representing the new event-pair is not visually obscured by the graphical object representing the third event-pair.

In a second aspect of the invention, a new event-pair is inserted into the data structure storing event-pairs within the trace of system operation. Start times of event-pairs within the data structure are examined to determine a second and a third event-pair, which have start times immediately preceding and immediately following the start time of the new event-pair, respectively. The new event-pair is then inserted into the data structure, wherein relationships between the new event-pair and the first and second event-pairs are specified according to a predetermined set of rules.

The above as well as additional objects, features, and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
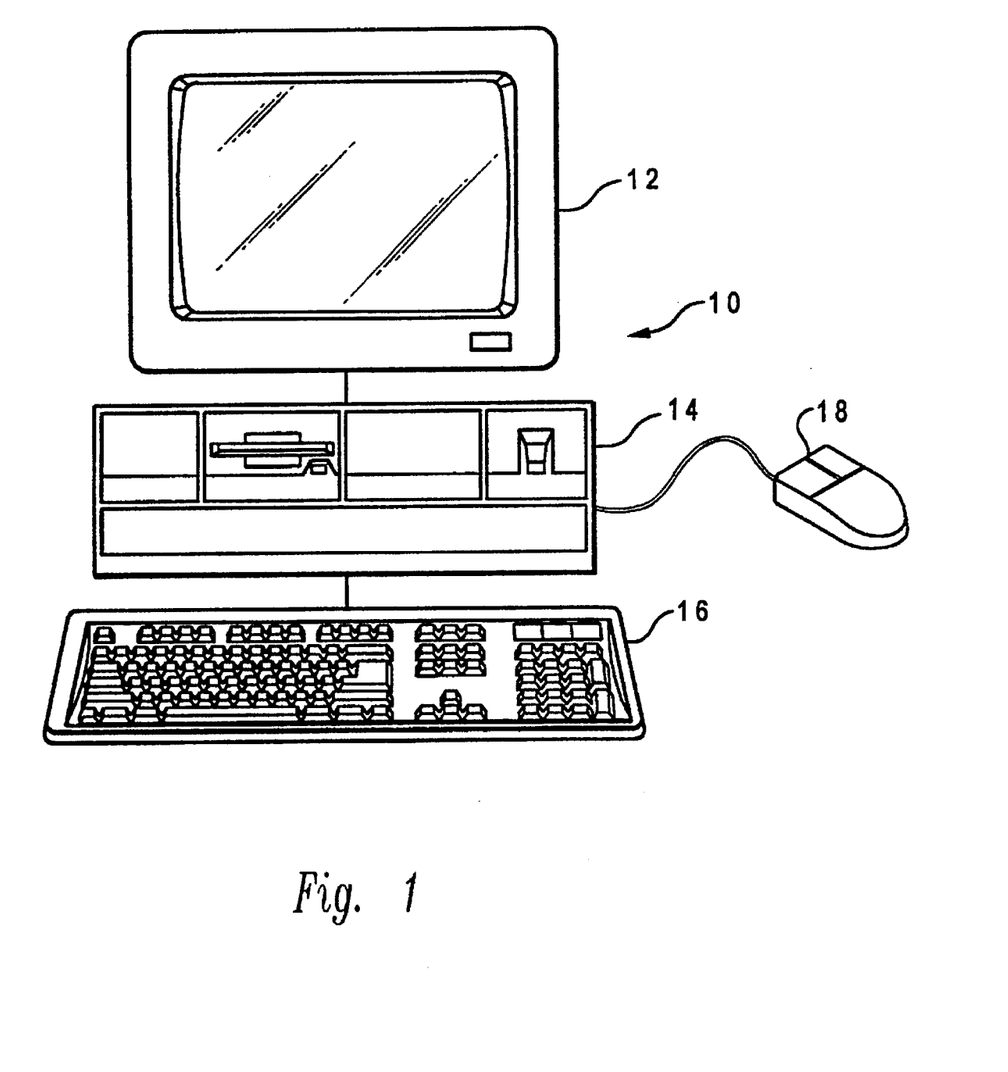
FIG. 1 illustrates a computer system which utilizes the method and system of the present invention to display trace chronologies.

With reference now to the figures and in particular with reference to FIG. 1, there is illustrated computer system 10 which displays trace chronologies in accordance with the method and system of the present invention. Computer system 10 comprises display device 12, processor 14, keyboard 16, and mouse 18. Tracing data is received and processed within processor 14. Trace chronologies are then displayed graphically within display device 12. A user may determine the portion of the trace chronology displayed within display device 12 or input additional data utilizing keyboard 16 or mouse 18.

Figure 2:
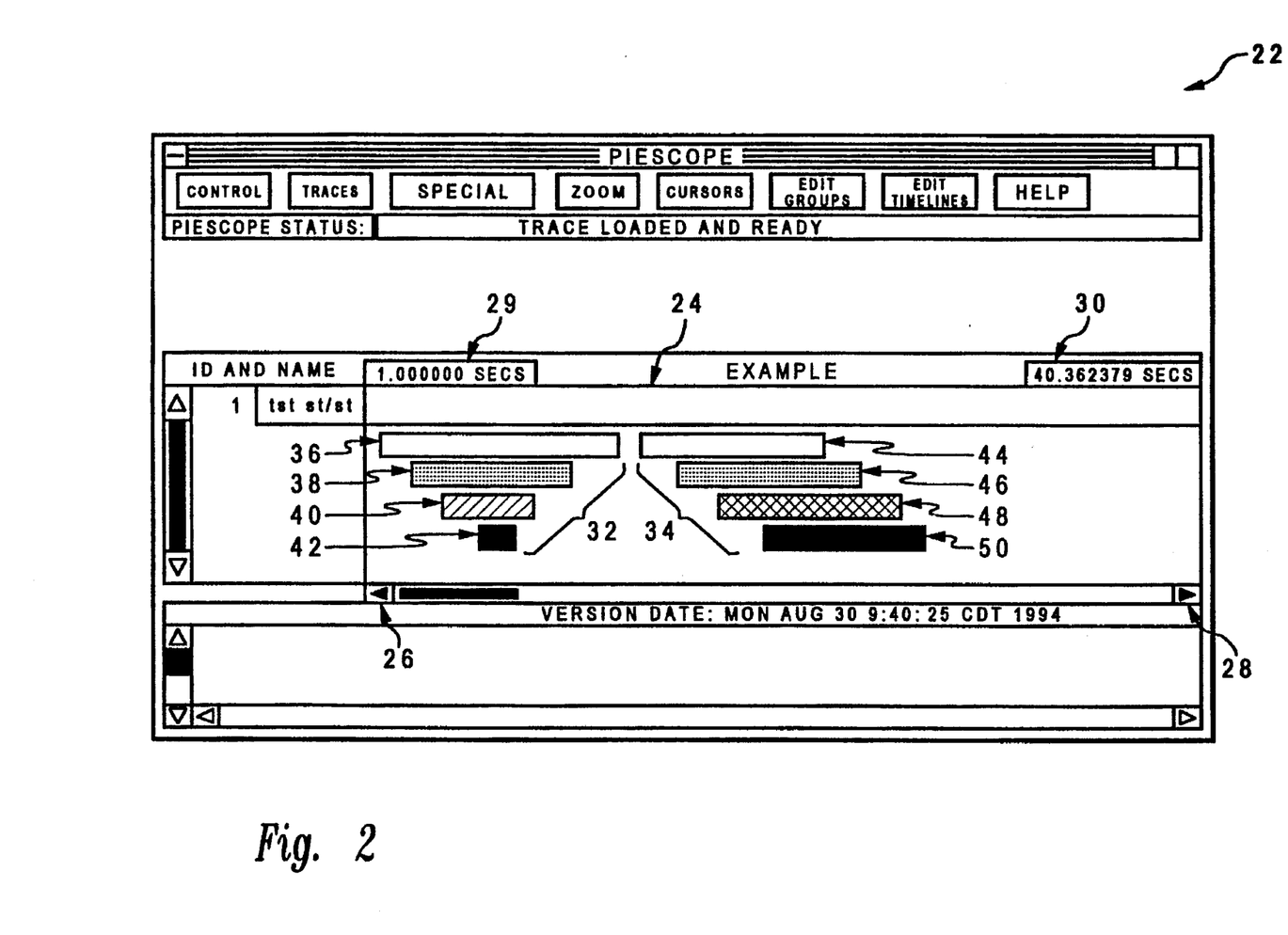
FIG. 2 depicts the display of a trace chronology containing synchronous and asynchronous nesting of event-pairs.

Referring now to FIG. 2, there is depicted window 22 which is displayed within display device 12 according to the method and system of the present invention. Window 22 includes time line 24 and scroll buttons 26 and 28, which may be utilized to select which portion of a trace chronology is displayed within window 22. The portion of time line 24 displayed within window 22 is indicated by time indicia 29 and 30.

Along time line 24, sets of event-pairs 32 and 34 are displayed. Set 32 is comprised of synchronously nested event-pairs 36, 38, 40, and 42. Set 34 is comprised of asynchronously nested event-pairs 44, 46, 48, and 50. As illustrated, there is no difficulty in displaying sets of event-pairs 32 and 34 since all event-pairs in set 32 terminate before event-pairs on corresponding nesting levels within set 34 begin.

Figure 3:
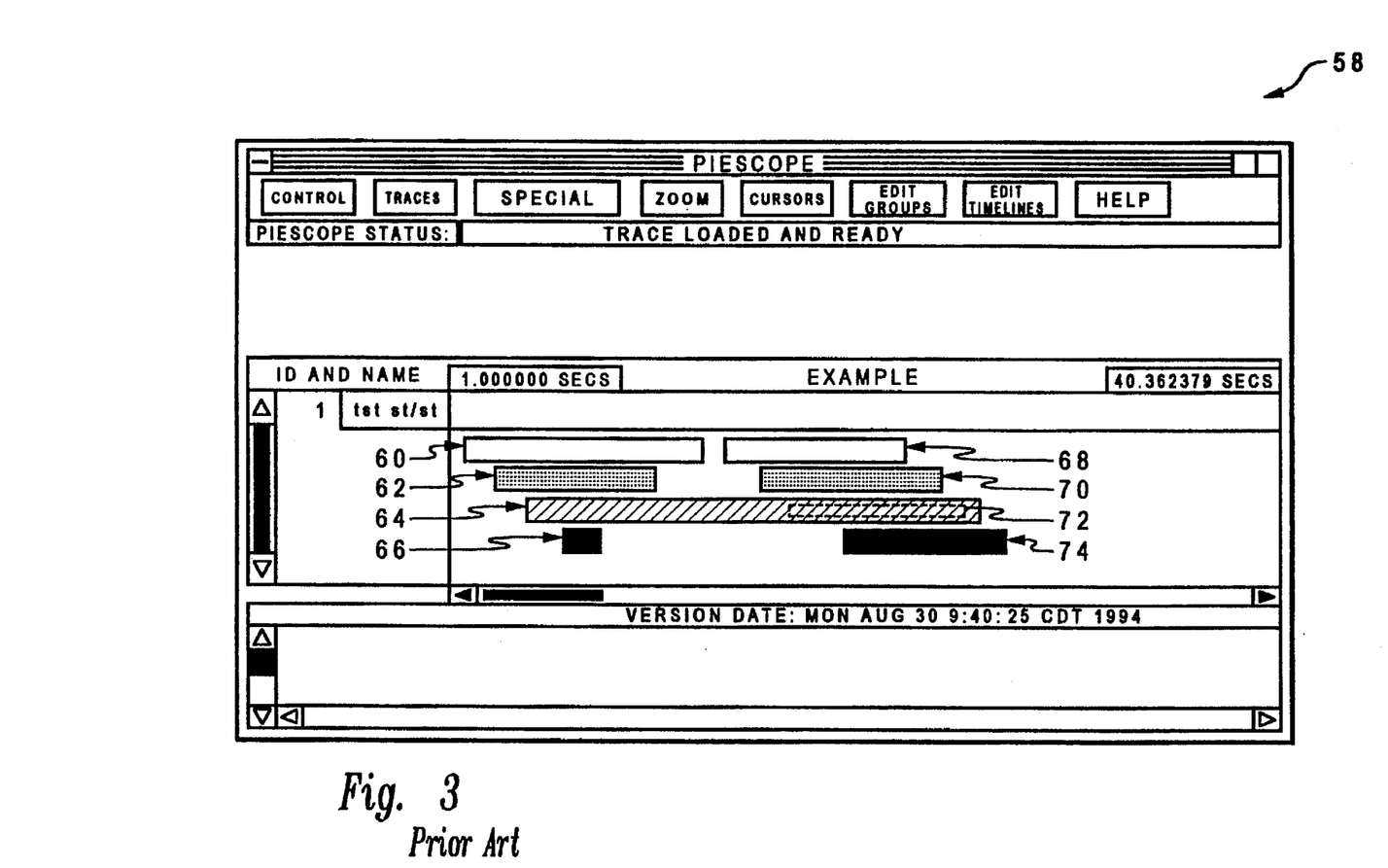
FIG. 3 illustrates a prior art display of a trace chronology in which a rectangle representing an asynchronously nested event-pair obscures a rectangle representing another event-pair.

With reference now to FIG. 3, there is illustrated an example of a prior art display of a trace chronology. Within window 58, several event-pairs 60–74 are displayed. As illustrated, event-pair 64 is asynchronously nested under event-pair 62 and has an endtime after the starttime of event-pair 72, which is asynchronously nested under event-pair 70. Because the endtime of event-pair 64 is also after the endtime of event-pair 72, event-pair 72 is totally obscured as indicated by its illustration with dashed lines. Consequently, a user of the prior art trace chronology tool depicted in FIG. 3 could not discern the existence or duration of event-pair 72 from the display within window 58.

Figure 4:
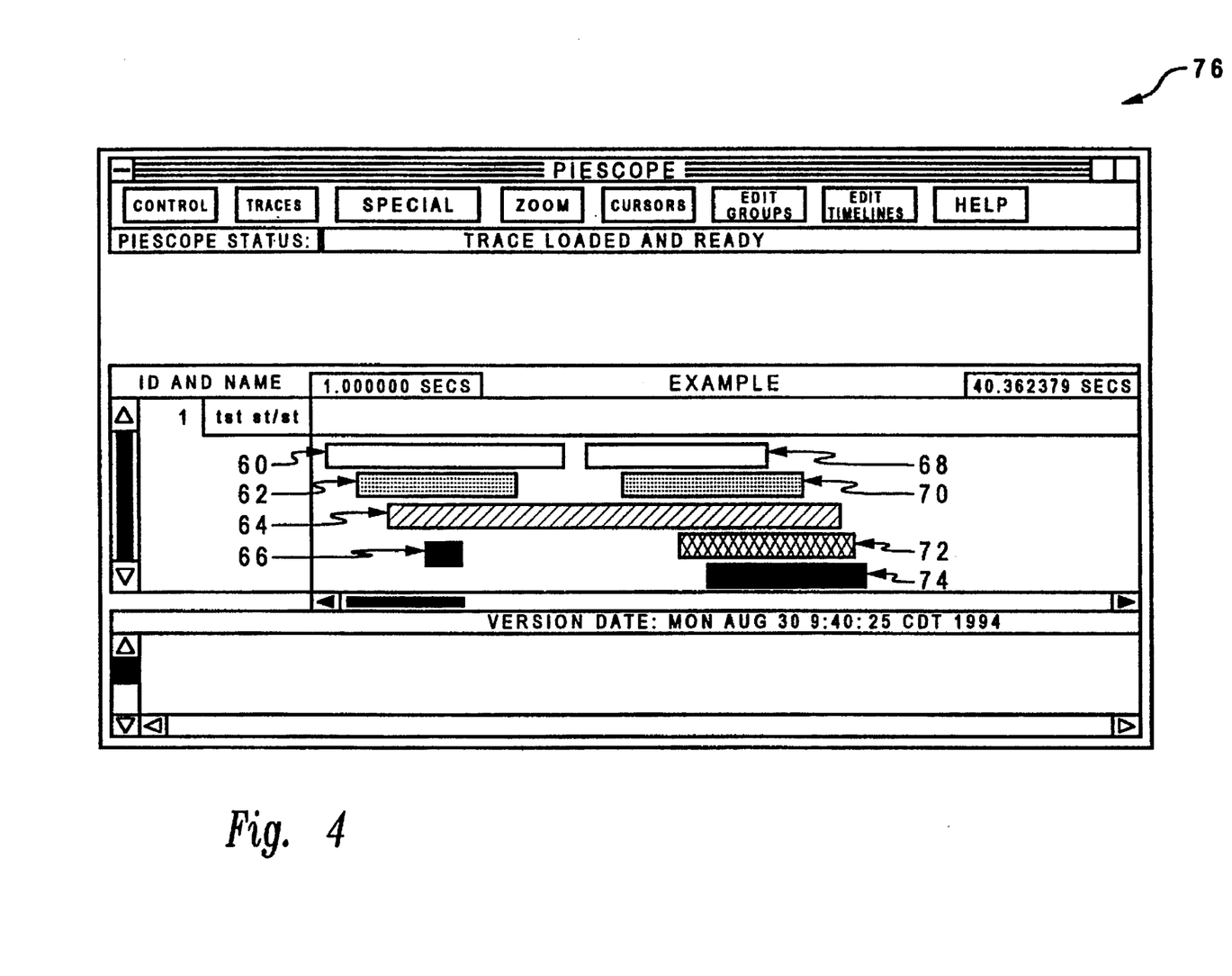
FIG. 4 depicts a display of the same trace chronology as illustrated in FIG. 3 utilizing the method and system of the present invention.

Referring now to FIG. 4, there is depicted a trace chronology displayed according to the method and system of the present invention. Event-pairs 60–74 comprise the same trace chronology as depicted in FIG. 3. However, as displayed within window 76, event-pair 64 no longer obscures event-pair 72. Instead, although event-pair 72 is at the third nesting level, like event-pair 64, it is displayed visually at a fourth level. Since a user of a trace chronology tool embodying the present invention would realize that for an event-pair to be nested with another event-pair, its starttime must be within the duration of all of the other event-pair's ancestors, the user could readily determine that event-pair 72 is asynchronously nested under event-pair 70 and not nested under event-pair 64. Thus, the present invention provides a graphical and intuitive manner of determining the nesting depth and nesting relationships of event-pairs within a trace chronology.

Figure 5:
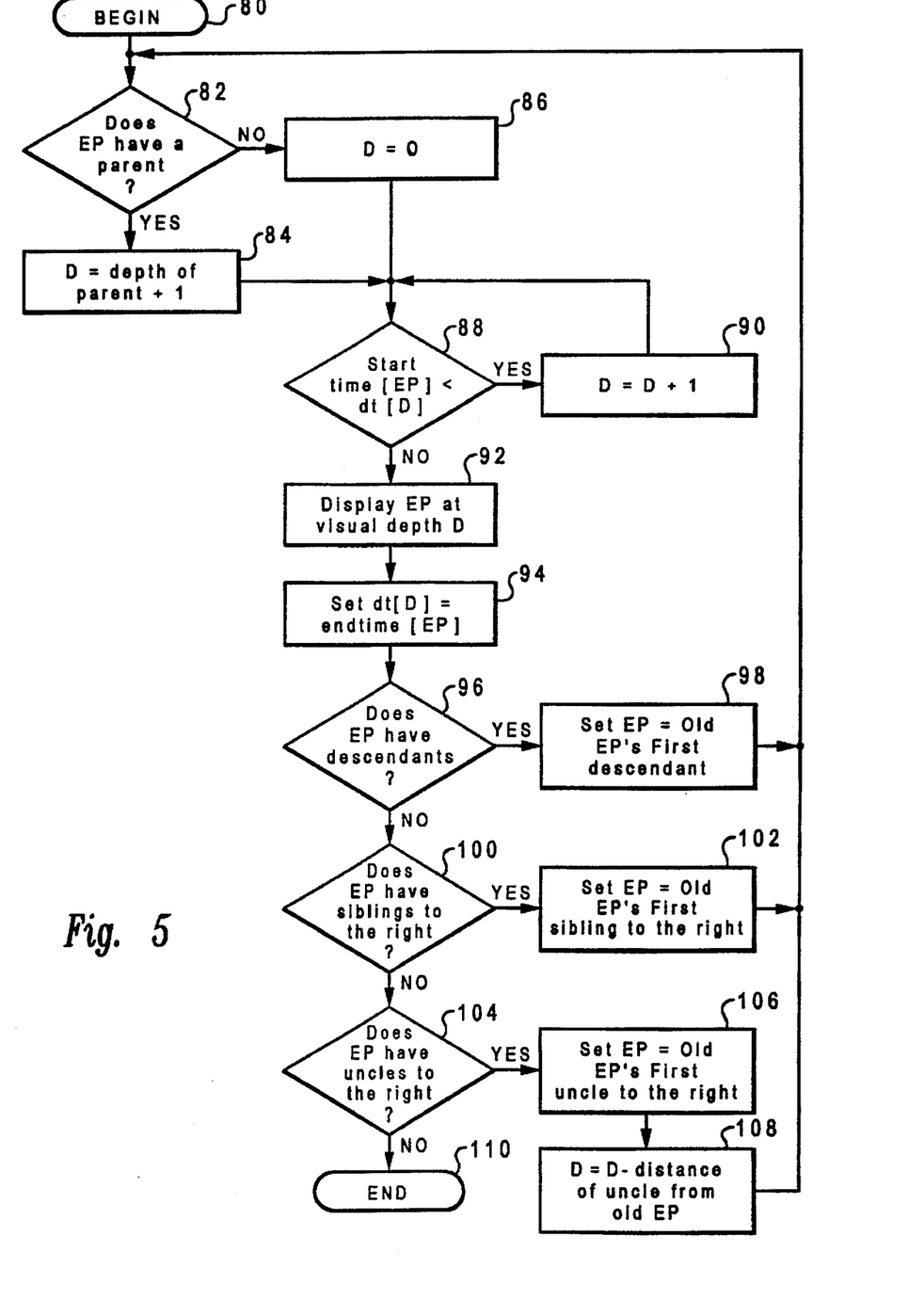
FIG. 5 is a flowchart illustrating the method utilized by the present invention to calculate the visual depth at which to display a graphical object representing an event-pair without obscuring graphical objects representing other event-pairs within the trace chronology.

With reference now to FIG. 5, there is illustrated a flowchart depicting the method of calculating the visual depth at which to display a nested event-pair according to the method and system of the present invention. The process illustrated in FIG. 5 may be implemented by a suitable program within computer system 10. Given the first event-pair within a trace chronology, the method determines the visual depth with reference to the timeline at which to display each graphical object in the trace chronology.

Figure 6:
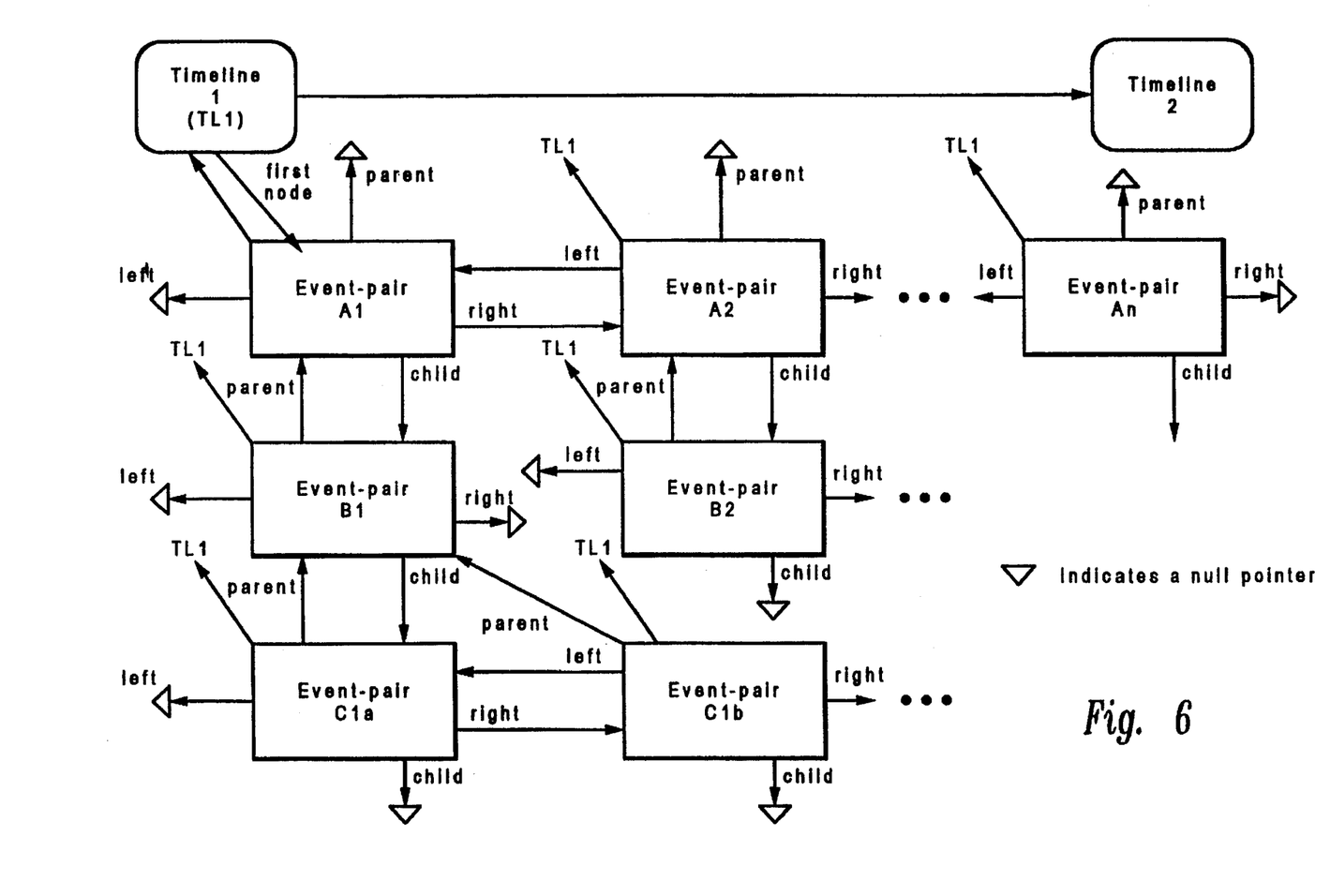
FIG. 6 depicts a data structure in which data utilized by a preferred embodiment of the present invention to display a trace chronology is stored.

In a preferred embodiment, data utilized to display event-pairs within a trace chronology are stored in a tree-like data structure, as depicted in FIG. 6. The data structure illustrated in FIG. 6 includes a plurality of event-pair nodes, each node storing the start and end times of the event-pair and pointers to the event-pair's parent, siblings, and earliest occurring child. In addition, each node contains data utilized to display a graphical object representing the event-pair. Event-pairs within the data structure are ordered under the time line in which they executed based on starttimes and endtimes. As illustrated, event-pair B1 is a descendant of event-pair A1 since STARTTIME (B1)>STARTTIME (A1) and STARTTIME (B1)<ENDTIME (A1). Similarly, event-pairs C1a and C1b are descendants of event-pair B1. Event-pair C1b is the right sibling of event-pair C1a since STARTTIME (C1b)≧ENDTIME (C1a). If a pointer of an event-pair is not linked to another event-pair within the data structure, the pointer is assigned a null value. For example, event-pair B2 has neither a left sibling, nor a child. Therefore, B2's child and left sibling pointers are assigned a null value.

Referring again to FIG. 5, the process begins in block 80 and thereafter proceeds to block 82, which illustrates determining if the event-pair has a parent under which it is nested. If the event-pair does not have a parent, as depicted in block 86, D, the current visual depth at which an event-pair is displayed, is set to zero. If, however, the event-pair does have a parent, the process proceeds to block 84, which depicts setting D to a depth of one level deeper than the parent of the event-pair.

Thereafter, the process proceeds from either of blocks 86 or 84 to block 88, which depicts determining if the starttime of the event-pair is earlier than the endtime of the latest occurring event-pair at depth D. For example, if event-pair 72 illustrated in FIG. 4 is the event-pair to be displayed, in block 88 of FIG. 5, the starttime of event-pair 72 would be compared to the endtime of event-pair 64, the latest occurring event-pair at a depth of 3. If the starttime of the event-pair to be displayed is earlier than the endtime of the latest occurring event-pair at depth D, the process proceeds to block 90, which depicts incrementing the current depth. Continuing with the example illustrated within FIG. 4, the depth at which event-pair 72 is displayed would be incremented from a depth of 3 to a depth of 4 within block 90. Thereafter, the processor repeats blocks 88 and 90 until the starttime of the event-pair to be displayed is later than the latest event-pair at depth D.

Thereafter, the process proceeds to block 92, which illustrates displaying the event-pair at a visual depth of D. As depicted in FIG. 4, event-pair 72 is displayed at a visual depth of 4, despite having a nesting depth of 3. Thereafter, the process proceeds to block 94, which illustrates setting the endtime of the latest occurring event-pair at depth D to the endtime of the event-pair just displayed.

The process then proceeds to block 96, which depicts determining if the event-pair has any descendants nested under it. This is done to locate the next event-pair for which a depth is to be calculated. For example, event-pair 74 illustrated in FIG. 4 is a descendant of event-pair 72. If the event-pair has descendants, the event-pair to be displayed is updated to be the just displayed event-pair's earliest occurring descendant. Thereafter, the process returns to block 82. If, however, the event-pair does not have descendants, the process proceeds to block 100.

Block 100 represents determining if the event-pair has siblings, event-pairs which are nested under the same event-pair as the just displayed event-pair, but are mutually unnested with the just displayed event-pair. If the event-pair has later occurring siblings, the process proceeds to block 102, which represents setting the event-pair to be displayed to the just displayed event-pair's first sibling to the right (i.e., first occurring later sibling). Thereafter, the process returns to block 82.

If the event-pair does not have later occurring siblings, the process proceeds to block 104, which depicts determining if the event-pair has later occurring uncles (i.e., siblings of the event-pair's parent). For example, event-pair 68 depicted in FIG. 4 is a later occurring uncle of event-pair 62. If the event-pair has later occurring uncles, the process proceeds to block 106, which illustrates setting the event-pair to be displayed to the just displayed event-pair's first later occurring uncle. Thereafter, the process proceeds to block 108, which depicts setting D, the current depth, to the depth of the just displayed event-pair less the difference in depth between the just displayed event-pair's first occurring uncle to the right and the just displayed event-pair. Thereafter, the process returns to block 82. If in block 104, the process determines that the current event-pair does not have later occurring uncles, the process thereafter terminates in block 110.

Figure 7A:
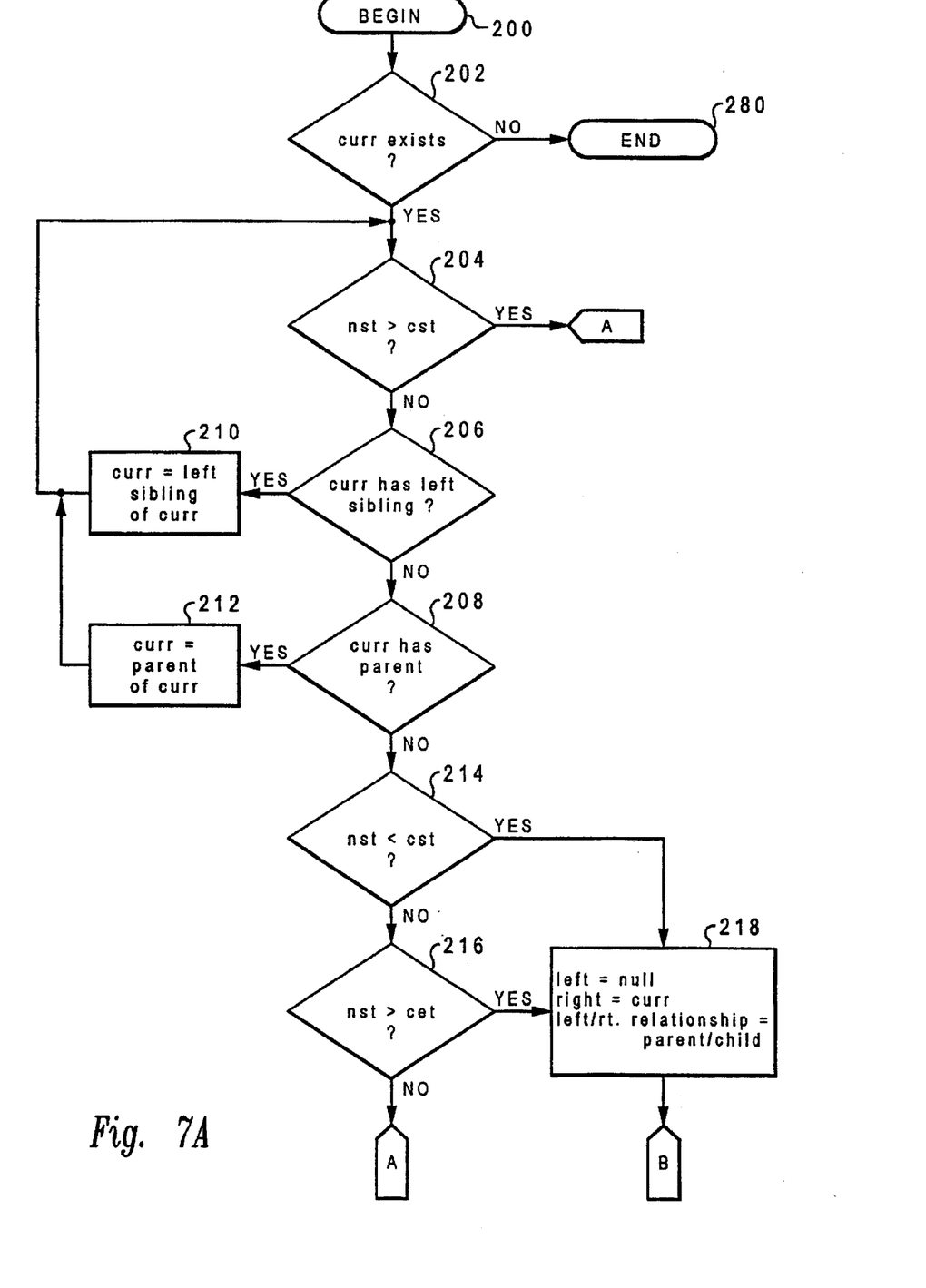
FIG. 7A–7C together comprise a flowchart illustrating the method utilized by the present invention to insert an event-pair into the data structure depicted in FIG. 6.
Figure 7B:
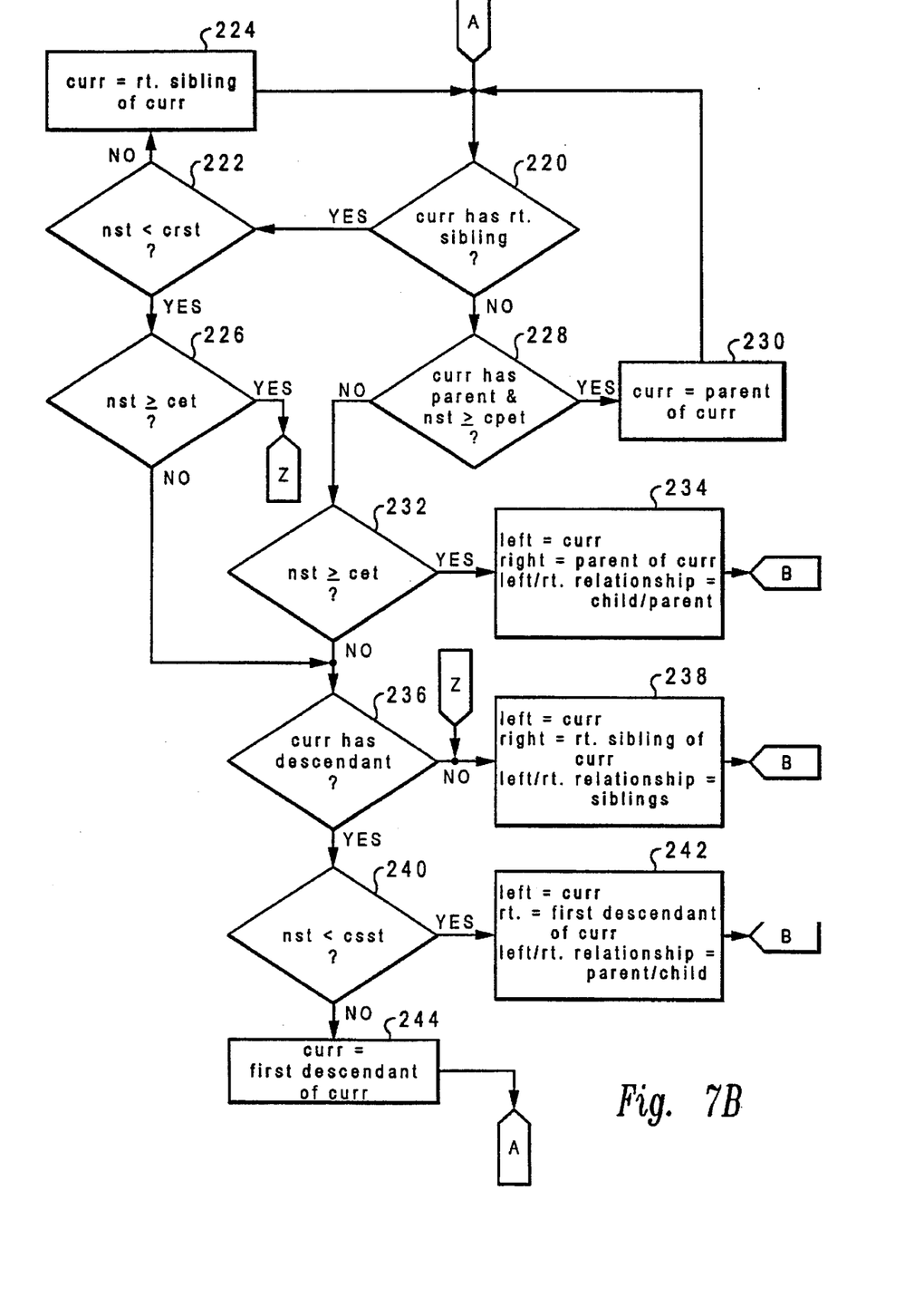
Figure 7C:
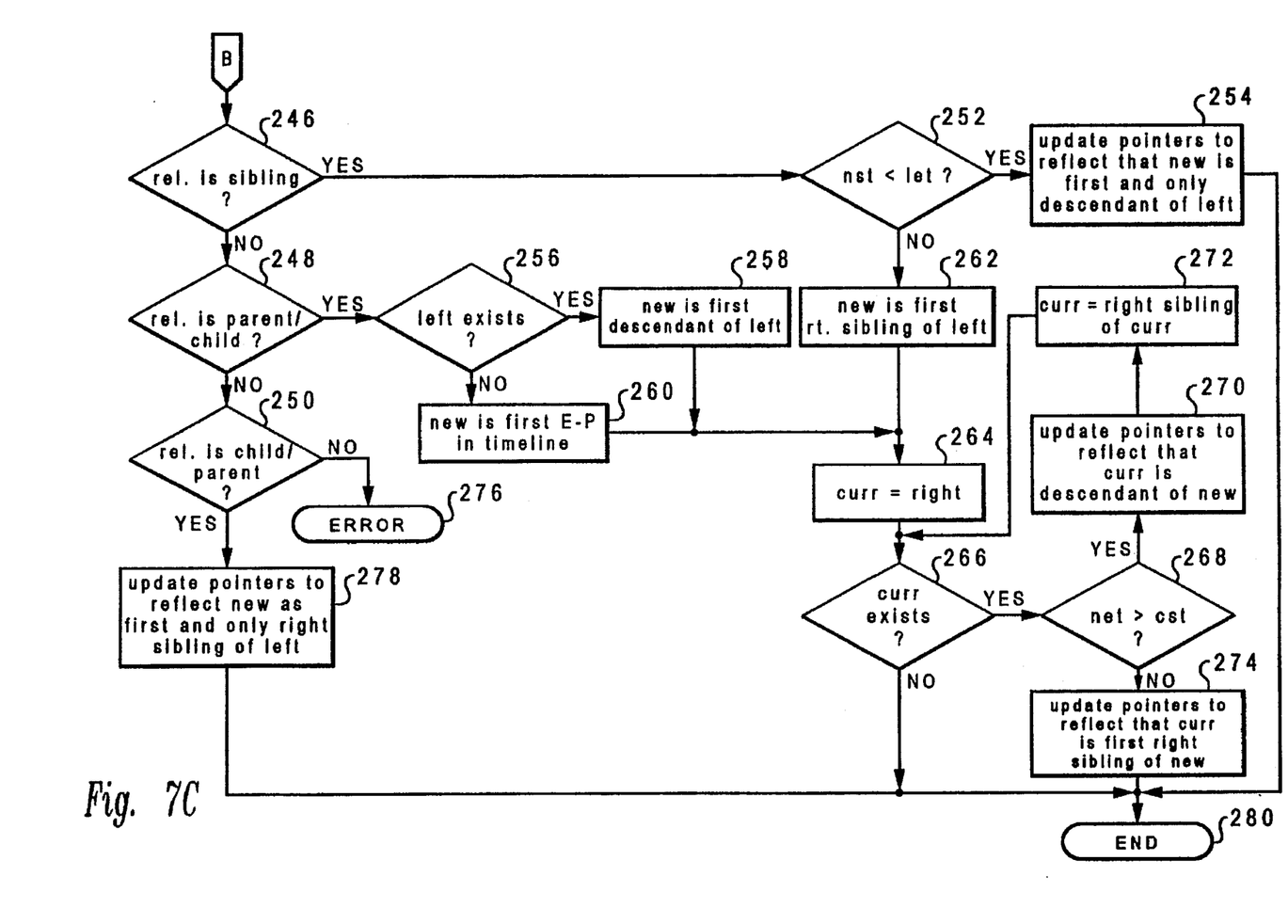

With reference now to FIGS. 7A–7C, there is illustrated a flowchart of the method utilized by the present invention to insert event-pairs into the data structure depicted in FIG. 6. The method may be performed by a suitably programmed computer, such as the computer system illustrated in FIG. 1. The flowchart illustrated in FIGS. 7A–7C is comprised of three stages. In the first stage, comprising blocks 200–218, the method compares only the starttime of new, the event-pair to be inserted, with the starttimes of event-pairs within the data structure. Beginning with the most recently inserted event-pair, the method scans the data structure in reverse chronological order to locate the event-pair ("Left") which has the latest occurring starttime prior to new's starttime. Then in stage two (blocks 220–244), the method traverses the data structure in chronological order to locate the event-pair ("Right") which has the earliest occurring starttime subsequent to the starttime of new. In the third stage, blocks 246–280, the method inserts event-pair new into the data structure according to the following rules:

1) If new starts before Left ends, then new is a descendant of Left.

2) If new starts after Left ends, then new is a right sibling of Left.

3) If new ends before Right starts, then new is a left sibling of Right.

4) If new ends after Right starts, then new is an ancestor of Right.

The following abbreviations will be utilized with reference to the flowchart of FIGS. 7A–7C:

new: event-pair to be inserted into the data structure;

curr: event-pair with which new is being compared;

nst: starttime of new;

net: endtime of new;

cst: starttime of curr.

cet: endtime of curr;

let: endtime of Left;

crst: starttime of the first right sibling of curr;

cpet: endtime of the parent of curr; and csst: starttime of the first child of curr.

As illustrated, the process begins at block 200, and thereafter proceeds to block 202, which illustrates determining if curr exists. When the process begins, curr is set to the event-pair most recently inserted into the data structure. If curr does not exist, the process terminates at block 280 since new, the event-pair to be inserted, is the first event-pair.

If curr exists, the process proceeds to block 204, which depicts determining if new's starttime is later than curr's starttime. Blocks 204–212 illustrate the process of scanning the data structure in reverse chronological order to locate Left, the event-pair having the starttime immediately preceding new's starttime. If at block 204, new's starttime is later than curr's starttime, the process proceeds to stage two, which begins at block 220. Recall that curr was originally the event-pair most recently inserted into the data structure. Otherwise, the process proceeds to block 206, which illustrates determining if curr has a left sibling. If so, the process returns to block 204 after updating curr at block 210. If at block 206 curt does not have a left sibling, the process determines at block 208 if curr has a parent. If so, the process returns to block 204 after updating curr at block 212. If the process iterates blocks 204–208 without locating Left, the process then proceeds from block 208 to block 214.

When the process proceeds to block 214, curr is set to the earliest occurring event-pair in the data structure, that is, the event-pair which has no left sibling and no parent. Block 214 illustrates determining if new's starttime is earlier than the starttime of curr. If nst is less than cst, the process proceeds to block 218, which depicts the insertion point for new. Block 218 illustrates that new has no left sibling, and has curr as its right sibling. In addition, block 218 specifies that the relationship between Left and Right prior to insertion is that of parent/child. This relationship designation is artificial since Left does not exist, but becomes important in stage three, where pointers of event-pairs surrounding the insertion point are updated.

If nst is less than cst, the process proceeds from block 214 to block 216, which depicts determining if new's starttime is later than curr's endtime. If so, the process proceeds to block 218, which has been described. From block 218, the process then proceeds to block 246. If nst is less than cet, the process proceeds to stage two, which begins at block 220.

In the second stage of the process, blocks 220–244, the process locates Right by scanning the data structure forward in time. Block 220 illustrates determining if curr has a right sibling. If so, the process proceeds to block 222, which depicts determining if new's starttime is earlier than the starttime of curr's right sibling. If not, the process returns to block 220 after updating curr at block 224. In this way, the process traverses the data structure until an event-pair having a starttime later than new is located. If in block 222, nst is less than crst, the process proceeds to block 226, which depicts determining if new's starttime is later than or concurrent with the endtime of curr. If so, the process proceeds to block 238. Otherwise, the process proceeds to block 236.

Returning to block 220, if curr does not have a right sibling, the process proceeds to block 228, which illustrates determining if curr has a parent with an endtime earlier than or concurrent with new's starttime. If so, the process returns to block 220 after updating curr at block 230. Otherwise, the process proceeds to block 232, which illustrates determining if new's starttime is later than or concurrent with curr's endtime. If so, the process proceeds to block 234. Block 234 illustrates that the insertion point has been found between curr, the event-pair immediately preceding new, and curr's parent, the event-pair immediately subsequent to new. In addition, block 234 specifies that the relationship between Left and Right is that of child/parent. Thereafter, the process proceeds to block 246.

Returning to block 232, the process proceeds from either block 226 or block 232 to block 236, which depicts determining if curr has a descendant. If not, the process proceeds to block 238, which illustrates new's insertion point, where curr is the event pair immediately preceding curr and curr's right sibling is the event-pair immediately subsequent to curr. Thereafter, the process proceeds to block 246.

Returning to block 236, if curr has a child, the process proceeds to block 240, which depicts determining if new's starttime is earlier than the starttime of curr's earliest occurring child. If so, the process proceeds to block 242, which details the insertion point. At block 242, the process determines that curr is the event-pair immediately preceding new and curr's first descendant is the event-pair immediately subsequent to new. Thereafter, the process proceeds to block 246. If at block 240, nst is less than csst, the process proceeds to block 244, which illustrates updating curr. The process then returns to block 220.

The third stage of the process begins at block 246. In the third stage of the process, new is inserted into the data structure and pointers surrounding the insertion point are updated depending upon the relationship between Left and Right. As illustrated, block 246 depicts determining if the relationship between Left and Right is that of siblings. If Left and Right are siblings, the process proceeds to block 252, which illustrates determining if new's starttime is earlier than Left's endtime. If so, the process proceeds to block 254, which illustrates updating the pointers within the data structure to reflect that new is the first and only child of Left. Otherwise, the process proceeds to block 262, in which the process determines that new is the earliest occurring right sibling of Left. Thereafter, the process proceeds to block 264.

ti

If the process determines at block 246 that Left and Right are not siblings, the process then determines at block 248 if Left is the parent of Right. If not, the process proceeds to block 250 which depicts determining if Left is the child of Right. If the process determines that Left is not the sibling, parent, or child of Right, the process terminates at block 276 to indicate that an error has occurred. If, however, the process determines that Left is the child of Right, the process proceeds to block 278, which depicts updating pointers within the data structure to reflect that new is the first and only right sibling of Left.

Returning to block 248, if the process determines that Left is the parent of Right, the process then proceeds to block 256. Block 256 depicts determining if Left is an event-pair, or merely a null pointer. If Left is a null pointer, the process proceeds to block 260 which depicts inserting new as the first event-pair in the time line. If the process determines at block 256 that Left exists, the process proceeds to block 258, which illustrates determining that new is the first descendant of Left.

The process then proceeds from block 258, 260, or 262 to block 264. Blocks 264–274 illustrate determining how to update pointers to the right of the insertion point. As illustrated, block 264 depicts setting curr, the event-pair with which new is being compared, to Right, the event-pair immediately subsequent to new. The process then proceeds to block 266, which depicts determining if curr exists, or is a null pointer. If curr is a null pointer, the process terminates at block 280. If, however, curr exists, the process proceeds to block 268, which illustrates determining if new's endtime is later than curr's starttime. If not, the process proceeds to block 274, which illustrates updating pointers within the data structure to reflect that curr is the first right sibling of new. The process then terminates at block 280.

If at block 268 net is greater than cst, the process proceeds from block 268 to block 270, which depicts updating pointers within the data structure to reflect that curr is a descendant of new. The process then proceeds to block 272, in which curr is updated to be the right sibling of curr. Thereafter, the process returns to block 266. The process repeats the loop of blocks 266–272 until either curr is a null pointer or net is greater than cst. The process then terminates at block 280.

As has been described, the present invention provides an improved method and system of displaying system operation trace information. A trace tool utilizing the present invention provides a user with a graphical and intuitive presentation of the nesting relationships of event pairs, including asynchronous event-pairs, within a trace chronology. The present invention is an improvement over prior art systems, which cannot accurately represent asynchronous event-pairs without obscuring graphical objects representing other event-pairs within the trace chronology.

In addition, the present invention provides an improved method and system for inserting event-pairs into a data structure storing system operation trace information. The present invention is an improvement over state-of-the-art systems utilizing complex algorithms which compare the start and end times of the event-pair to be inserted into the data structure with the start and end times of each event-pair within the data structure. The complexity of these algorithms is also due to their inefficiency in handling asynchronously nested event-pairs, which require multiple relationship tests to determine the correct insertion point and to update the relationships of event-pairs surrounding the insertion point. The present invention eliminates these complexities by locating the event-pair immediately preceding the new event-pair by comparing only the starttime of the new event-pair with the starttime of event-pairs within the data structure. Then, the event-pair immediately subsequent to the new event-pair is located by comparing the starttime of the new event-pair with start and end times of event-pairs within the data structure. Once Left and Right have been located, it is known that the event-pair to be inserted is either a child or sibling of Left and a sibling or parent of Right. Utilizing simple relationship rules, the precise insertion point is then determined and surrounding pointers are updated. Thus, the present invention provides a process which requires fewer comparisons than prior art algorithms, and therefore provides enhanced performance.

While the invention has been particularly shown and described with reference to a preferred embodiment, it will be understood by those skilled in the art that various changes in form and detail may be made therein without departing from the spirit and scope of the invention.

What is claimed is:

1. A method of displaying system operation trace information within a display device of a computer, comprising:
    displaying a window within said display device;
    displaying an axis within said window having points along said axis which correspond to time;
    displaying graphical objects in relation to said axis which correspond to selected event-pairs within said system operation, such that a position of a graphical object in relation to said axis is indicative of a starting and an ending time of an event-pair corresponding to that graphical object, wherein a relative position of any two of said graphical objects is indicative of a nesting relationship therebetween; and
    in response to a new event-pair having a starting time nested within a prior event-pair, said starting time preceding an ending time of a third event-pair having a nesting depth identical to said new event-pair, automatically displaying a graphical object representing said new event-pair adjacent to a graphical object representing said prior event-pair such that said graphical object representing said new event-pair is not visually obscured by a graphical object representing said third event-pair.

2. A system for displaying system operation trace information within a display device of a computer, comprising:
    means for displaying a window within said display device;
    means for displaying an axis within said window having points along said axis which correspond to time;
    means for displaying graphical objects in relation to said axis which correspond to selected event-pairs within said system operation, such that a position of a graphical object in relation to said axis is indicative of a starting and an ending time of an event-pair corresponding to that graphical object, wherein a relative position of any two of said graphical objects is indicative of a nesting relationship therebetween; and
    means, responsive to a new event-pair having a starting time nested within a prior event-pair, said starting time preceding an ending time of a third event-pair having a nesting depth identical to said new event-pair, for automatically displaying a graphical object representing said new event-pair adjacent to a graphical object representing said prior event-pair such that said graphical object representing said new event-pair is not visually obscured by a graphical object representing said third event-pair.

3. The system for displaying system operation trace information of claim 2, wherein said graphical objects are rectangles.

4. A method of displaying system operation trace information within a display device of a computer, comprising:
    displaying a window within said display device;
    displaying an axis within said window having points along said axis which correspond to time;
    determining if an event-pair within said system operation, having a starttime and an endtime, has a parent with which said event-pair is nested;
    in response to determining that said event-pair does not have a parent with which said event-pair is nested, setting a visual depth counter to 0;
    in response to determining that said event-pair has a parent with which said event-pair is nested, setting said visual depth counter to a visual depth 1 level greater than a visual depth of said parent with which said event-pair is nested;
    determining if said starttime of said event-pair is earlier than an endtime of a latest occurring prior event-pair at a visual depth indicated by said visual depth counter;
    in response to determining that said starttime of said event-pair is earlier than an endtime of a latest occurring prior event-pair at a visual depth indicated by said visual depth counter, incrementing said visual depth counter until said starttime of said event-pair is later than an endtime of a latest occurring prior event-pair at a visual depth indicated by said visual depth counter;
    displaying a graphical object corresponding to said event-pair at a visual depth with respect to said axis indicated by said visual depth counter, such that a position of said graphical object along said axis is indicative of said starttime and said endtime of said event-pair, and such that said visual depth at which said graphical object is displayed is indicative of a nesting level of said event-pair; and
    setting said endtime of a latest occurring prior event-pair at said depth indicated by said visual depth counter to said endtime of said event-pair.

5. A system for displaying system operation trace information within a display device of a computer, comprising:
    means for displaying a window within said display device;
    means for displaying an axis within said window having points along said axis which correspond to time;
    means for determining if an event-pair within said system operation, having a starttime and an endtime, has a parent with which said event-pair is nested;
    means, responsive to determining that said event-pair does not have a parent with which said event-pair is nested, for setting a visual depth counter to 0;
    means, responsive to determining that said event-pair has a parent with which said event-pair is nested, for setting said visual depth counter to a visual depth 1 level greater than a visual depth of said parent with which said event-pair is nested;

means for determining if said starttime of said event-pair is earlier than an endtime of a latest occurring prior event-pair at a visual depth indicated by said visual depth counter;

means, responsive to determining that said starttime of said event-pair is earlier than an endtime of a latest occurring prior event-pair at a visual depth indicated by said visual depth counter, for incrementing said visual depth counter until said starttime of said event-pair is later than in endtime of a latest occurring prior event-pair at a visual depth indicated by said visual depth counter;

means for displaying a graphical object corresponding to said event-pair at a visual depth with respect to said axis indicated by said visual depth counter, such that a position of said graphical object along said axis is indicative of said starttime and said endtime of said event-pair, and such that said visual depth at which said graphical object is displayed is indicative of a nesting level of said event-pair; and means for setting said endtime of a latest occurring prior event-pair at said depth indicated by said visual depth counter to said endtime of said event-pair.

6. A method of inserting an event-pair into a data structure storing a plurality of event-pairs and specifying relationships between said plurality of event-pairs, comprising:

examining start times of event-pairs within said data structure to determine a first event-pair having a start time immediately preceding a start time of an event-pair to be inserted;

comparing said start time of said event-pair to be inserted with start times and end times of later occurring event-pairs within said data structure to determine a second event-pair having a start time immediately following said start time of said event-pair to be inserted;

inserting said event-pair to be inserted into said data structure; and specifying relationships between said event-pair to be inserted and said first and said second event-pairs according to a predetermined set of rules.

7. The method of inserting an event-pair into a data structure of claim 6, wherein said step of specifying relationships between said event-pair to be inserted and said first and said second event-pairs comprises:

in response to said event-pair to be inserted having a start time prior to an end time of said first event-pair, specifying that said event-pair to be inserted is a descendant of said first event-pair;

in response to said event-pair to be inserted having a start time subsequent to an end time of said first event-pair, specifying that said event-pair to be inserted is a sibling of said first event-pair;

in response to said event-pair to be inserted having an end time prior to a start time of said second event-pair, specifying that said event-pair to be inserted is a sibling of said second event-pair; and in response to said event-pair to be inserted having an end time subsequent to a start time of said second event-pair, specifying that said event-pair to be inserted is an ancestor of said second event-pair.

8. A system for inserting an event-pair into a data structure storing a plurality of event-pairs and specifying relationships between said plurality of event-pairs, comprising:

a memory storing said data structure;

means for examining start times of event-pairs within said data structure to determine a first event-pair having a start time immediately preceding a start time of an event-pair to be inserted;

means for comparing said start time of said event-pair to be inserted with start times and end times of later occurring event-pairs within said data structure to determine a second event-pair having a start time immediately following said start time of said event-pair to be inserted;

means for inserting said event-pair to be inserted into said data structure; and means for specifying relationships between said event-pair to be inserted and said first and said second event-pairs according to a predetermined set of rules.

\* \* \* \* \*